United States Patent
Popovici et al.

(10) Patent No.: US 9,489,283 B1
(45) Date of Patent: Nov. 8, 2016

(54) UNIFIED HARDWARE AND SOFTWARE DEBUGGING

(71) Applicant: The MathWorks, Inc., Natick, MA (US)

(72) Inventors: Katalin Maria Popovici, Natick, MA (US); Pieter J. Mosterman, Framingham, MA (US); Brian K. Ogilvie, Holliston, MA (US); Rajiv Ghosh-Roy, Hudson, MA (US); Adam C. Leon, Brookline, MA (US); Jared D. Macdonald, Cambridge, MA (US)

(73) Assignee: The MathWorks, Inc., Natick, MA (US)

( * ) Notice: Subject to any disclaimer, the term of this patent is extended or adjusted under 35 U.S.C. 154(b) by 231 days.

(21) Appl. No.: 13/828,062

(22) Filed: Mar. 14, 2013

(51) Int. Cl.
G06F 9/44 (2006.01)
G06F 11/36 (2006.01)

(52) U.S. Cl.
CPC ........ *G06F 11/3636* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 6,853,963 B1 | 2/2005 | Apfelbaum et al. | |
| 7,043,415 B1 | 5/2006 | Dunlavey et al. | |
| 7,464,373 B1 * | 12/2008 | Yunt et al. | 717/125 |
| 7,496,895 B1 | 2/2009 | Mosterman et al. | |
| 7,774,172 B1 * | 8/2010 | Yunt et al. | 703/2 |
| 8,219,378 B1 * | 7/2012 | Koh | 703/21 |
| 8,893,094 B2 * | 11/2014 | Chee | G06F 8/44 712/220 |
| 9,317,263 B2 * | 4/2016 | Chee | G06F 8/44 |
| 2001/0005852 A1 * | 6/2001 | Bogle et al. | 709/102 |
| 2003/0084127 A1 | 5/2003 | Budhiraja et al. | |
| 2004/0073413 A1 | 4/2004 | Aberg et al. | |
| 2004/0088678 A1 | 5/2004 | Litoiu et al. | |
| 2004/0172623 A1 | 9/2004 | Eckels et al. | |
| 2007/0277151 A1 * | 11/2007 | Brunel et al. | 717/113 |
| 2012/0096439 A1 * | 4/2012 | Lin et al. | 717/125 |
| 2013/0173893 A1 * | 7/2013 | Hwa Chee | G06F 8/44 712/226 |

OTHER PUBLICATIONS

Co-pending U.S. Appl. No. 12/254,052, entitled "Multi-Domain Unified Debugger", by Mosterman et al., filed Oct. 20, 2008, 33 pages.
Co-pending U.S. Appl. No. 13/241,998, entitled "Standardized GUI for Multiple Execution Domains", by Popovici et al., filed Sep. 23, 2011, 62 pages.

* cited by examiner

*Primary Examiner* — Matthew Brophy
(74) *Attorney, Agent, or Firm* — Harrity & Harrity, LLP

(57) ABSTRACT

A device receives information specifying a functional model that includes a set of variables and a set of computations, and receives debugging information associated with the functional model. The device generates computer code based on the set of computations associated with the functional model, the set of variables associated with the functional model, and the received debugging information. The device executes the generated computer code based on the debugging information.

33 Claims, 14 Drawing Sheets

UNIFIED HARDWARE AND SOFTWARE DEBUGGING

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

Software developers may utilize debugging tools, often referred to as debuggers, when developing software. Debuggers may assist in the software development process by, for example, executing segments of a software program to determine whether the software is operating properly. However, debuggers are often language-specific, meaning that in order for a software developer to debug a software program that includes multiple programming languages, the software developer may be required to debug the software program using multiple debuggers one debugger at a time.

Furthermore, many integrated development environments (IDEs) support multiple programming languages, but may only support debugging in the context of one programming language to another programming language. Such IDEs simply require a user to set up separate projects that are technology specific (e.g., a C++ project, a Java project, etc.), which prevents seamless debugging from one programming language to another programming language. Thus, when debugging a project implemented in multiple programming languages, the user may be inconvenienced by having to jump between IDEs.

Overview

Systems and/or methods described herein may enable a user to define debugging information in a high level programming language (e.g., a functional model), and may rewrite the debugging information to a lower level programming language (e.g., C code, Java code, etc.) so that debugging may occur in the lower level programming language. In one example implementation, the systems and/or methods may provide unified debugging of an application which is implemented in a combination of declarative programming languages (e.g., the hardware description language (HDL)) and imperative programming languages (e.g., the C programming language). In other words, depending on the application, the high level programming language may be converted into a combination of descriptive languages, imperative languages, or either of these languages. The systems and/or methods may provide a unified interface for debugging the application, independent of the final form of the application, which may be a combination of hardware code (e.g., code written in a hardware description language, such as VHDL, Verilog, SystemC, etc.), compilable software code (e.g., code written in the C, Java, etc. programming languages), as well as interpreted code that executes in conjunction with an executive and need not be compiled (e.g., MATLAB code, Python code, etc.).

Figure 1:
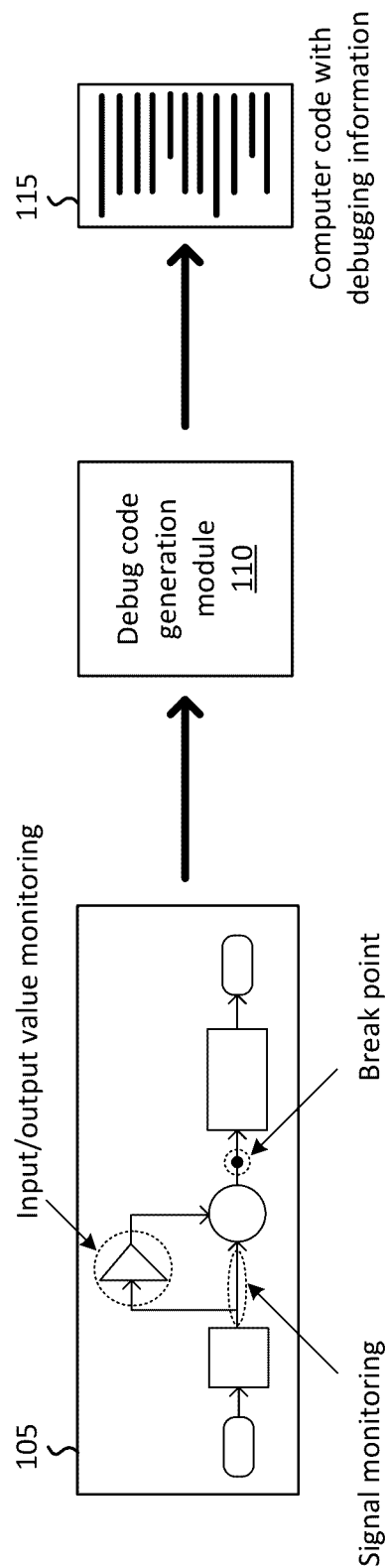
FIG. 1 is a diagram of an overview of an example implementation described herein.

FIG. 1 is a diagram of an overview of an example implementation described herein. As shown in FIG. 1, a computing environment, such as a technical computing environment (TCE), may include a functional model 105 and a debug code generation module 110. In one example, the TCE may receive information associated with functional model 105, and may provide (e.g., display) a visual representation of functional model 105 to a user of the TCE.

Functional model 105 may include an algorithmic model, a block diagram model, etc. produced by the TCE. Functional model 105 may include one or more nodes (e.g. blocks), one or more connections between the nodes, one or more inputs and/or outputs for the nodes, etc. In one example, a user may specify debugging information in functional model 105. The debugging information may include test points (e.g., signal or state monitoring), input/output points (e.g., input/out value monitoring), break points (e.g., conditional break points), assertions (e.g., conditional break points with complex conditions), etc. associated with functional model 105. In one example, the TCE may receive the debugging information from the user via the visual representation of functional model 105.

Debug code generation module 110 may receive functional model 105 and the debugging information, and may generate computer code 115 with a functionally equivalent form of the debugging information. The debugging information may be generated as part of computer code 115, or may be generated as separate (e.g., as directives or meta information accessible by the IDE as part of a program database) from computer code 115. Alternatively, or additionally, debug code generation module 110 may generate code that is modified compared to code that would be generated from functional model 105 without the debugging information, to produce computer code 115. In one example, computer code 115 may include compiled HDL code that may need to be synthesized to execute on hardware, uncompiled software code (e.g., C code, Java code, etc.) that may need to be compiled before execution, etc. In one implementation, the user may select a computer code language (e.g., a programming language) associated with the debugging information, and debug code generation module 110 may generate computer code 115 in the selected computer code language. In some implementations, computer code 115 may include a portion that is interpreted to execute in conjunction with the generated code (which has been compiled and/or synthesized). Functional model 105 may include a higher level representation of computer code 115, and debug code generation module 110 may automatically translate the debugging information from the higher level representation to the lower level representation of computer code 115.

Although not shown in FIG. 1, in one example implementation, the TCE may execute computer code 115, and may generate debugging data based on the execution of computer code 115. The debugging data may include data generated based on the debugging information. For example, if the debugging information specifies "monitor variable A" in functional model 105, the debugging data may include identified values of variable A over time. The TCE may store and/or output (e.g., provide for display) the generated debugging data.

The terms "code," "program," "program code," "computer code," and/or "programming code," as used herein, are to be used interchangeably and are to be broadly interpreted to include text-based code that may require further processing to execute (e.g., C++ code, HDL code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field-programmable gate array (FPGA), Java byte code, object files combined together with linker directives, source code, makefiles, etc.); text files that may be executed in conjunction with other executables (e.g., Python code written as text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations.

A declarative language may specify constraints on variables and the values of the variables. With a declarative language, instructions may include a set of constraints over variables. The constraints may cause a change in state that is affected simultaneously for all states affected by constraints. A constraint may not be able to state when an explicit state change occurs in the computation of the new state. An imperative language may describe when to explicitly change a state and the values of the variables. With an imperative language, it may be important for a user to know what a sequence of execution is for instructions since the user may obtain the state and make explicit changes to the state every time an instruction is executed.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of the TCE (e.g., via a touch screen display, a mouse, a keyboard, a keypad, voice commands, etc.).

Example Environment Arrangement

Figure 2:
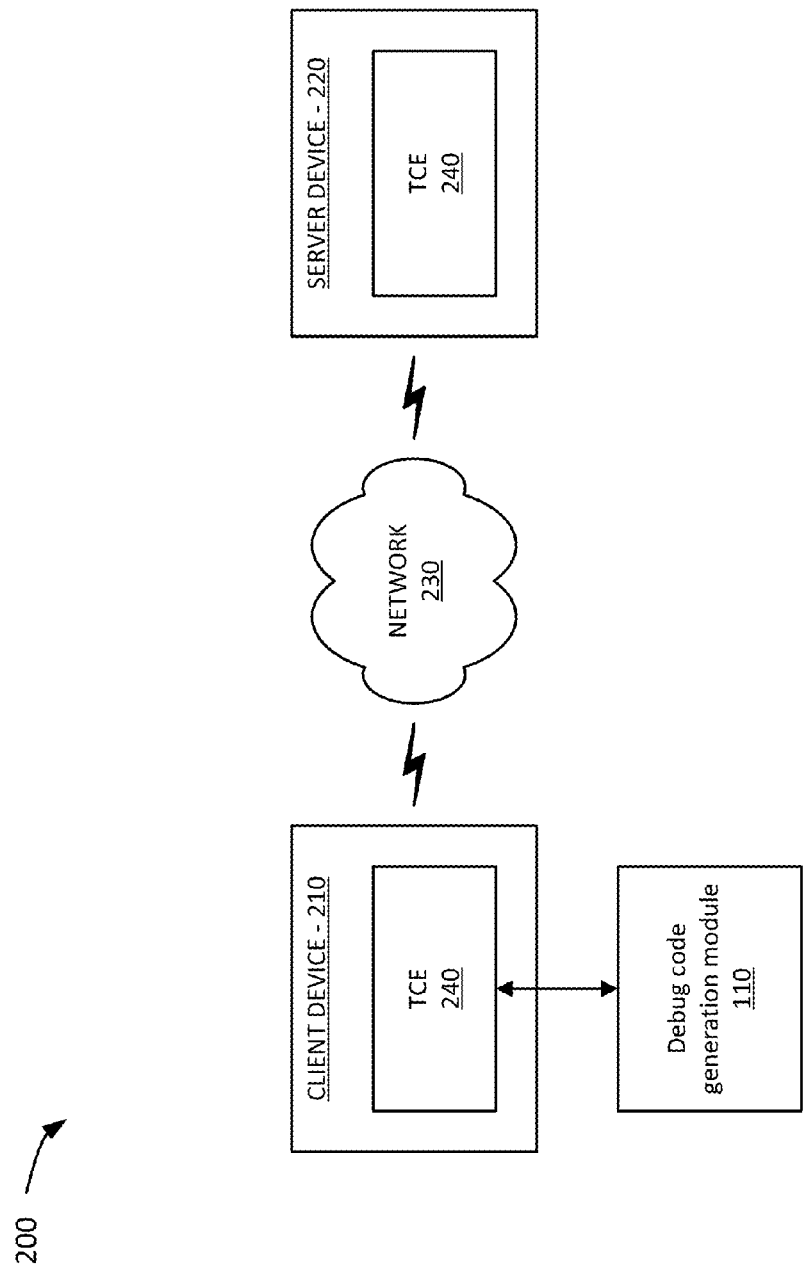
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In some implementations, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for server device 220.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In some implementations, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systèmes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systèmes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

TCE 240 may include a modeling system that may be used in the creation of a functional model and that may enable generation of executable code based on the model. For example, TCE 240 may include a graphical modeling tool or application that provides a user interface for a numerical computing environment. Additionally, or alternatively, TCE 240 may include a graphical modeling tool and/or application that provides a user interface for modeling and simulating (e.g., by executing a model) a dynamic system (e.g., based on differential equations, difference equations, algebraic equations, discrete events, discrete states, stochastic relations, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may include, for example, blocks connected by lines (e.g., connector lines). The blocks may include elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may include meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Equations may also include inequalities which need to be satisfied, for example $X<2Y+U$. These inequalities may be solved in conjunction with equations. In the case of multiple possible solutions to the equations, a single solution may be selected based on one or more criteria, such as an optimization criterion. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. Additionally, or alternatively, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

As further shown in FIG. 2, TCE 240 may be associated with debug code generation module 110. Debug code generation module 110 may include the features described above in connection with, for example, FIG. 1. In one example, debug code generation module 110 may be part of TCE 240. Alternatively, or additionally, debug code generation module 110 may be a separate component from TCE 240.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
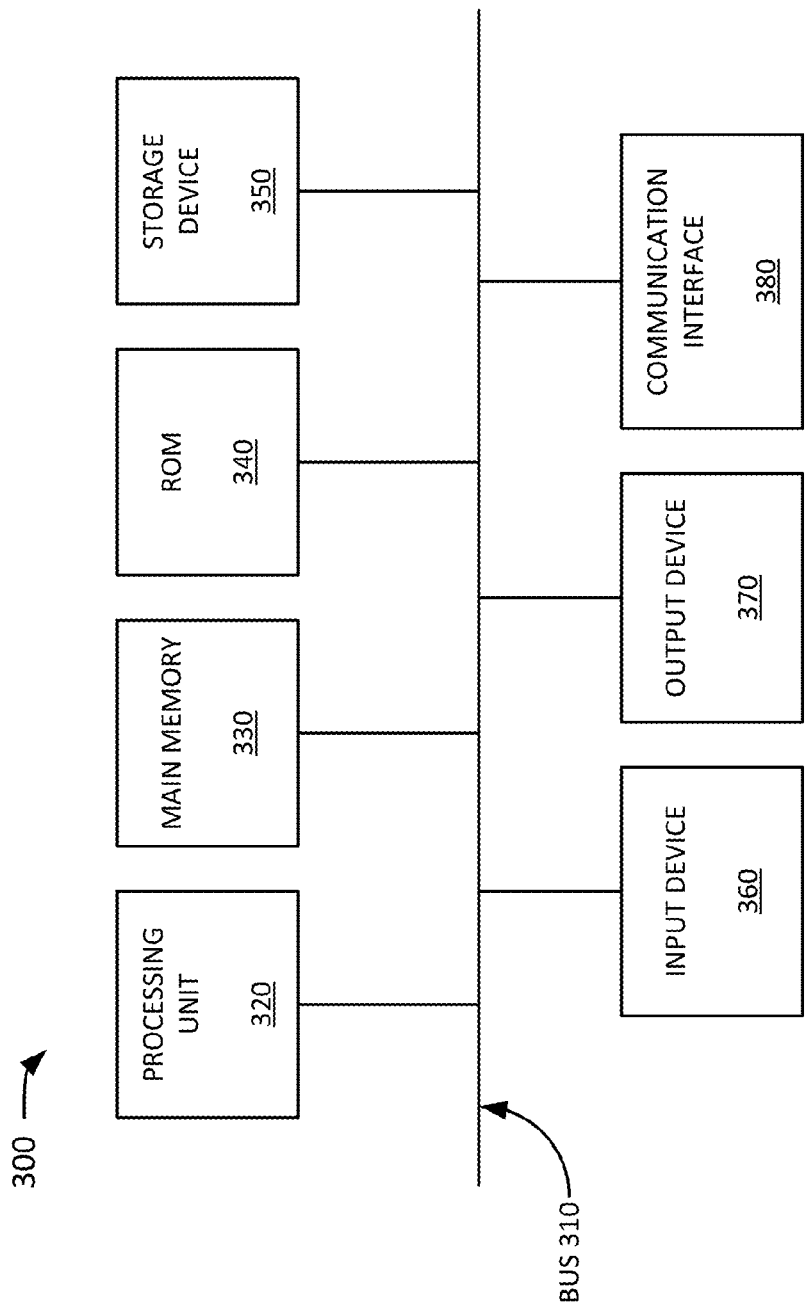
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Process for Configuring Debug Code Generation Module

Figure 4:
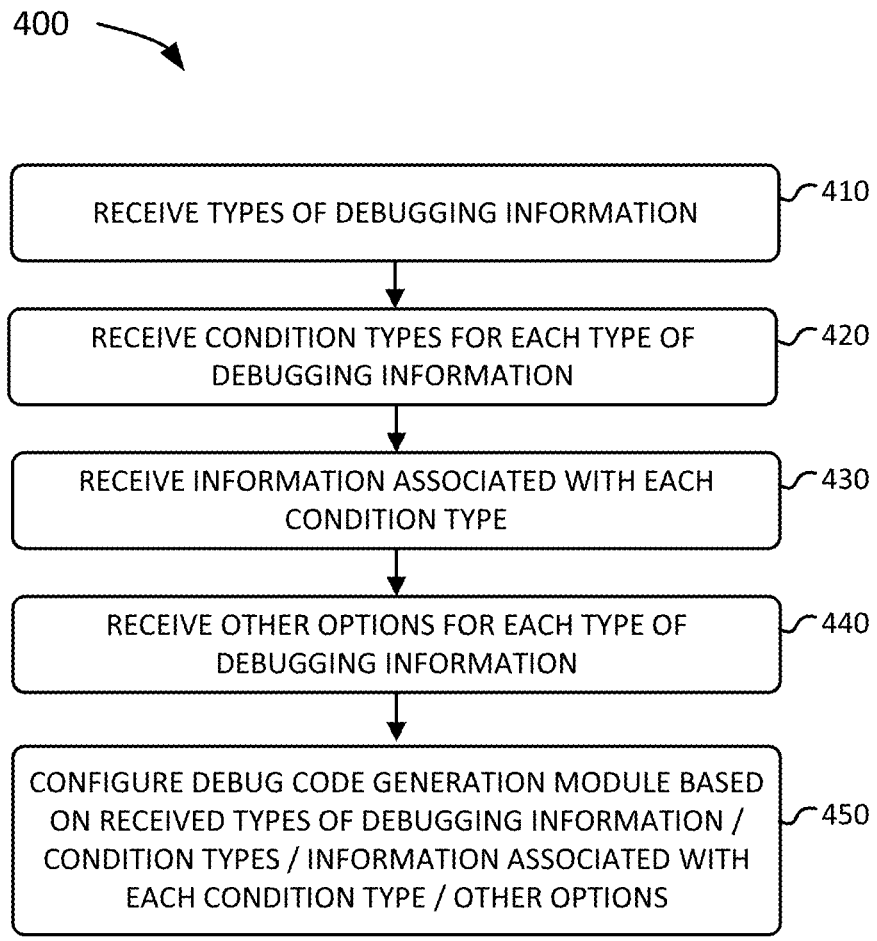
FIG. 4 is a flow chart of an example process for configuring a debug code generation module.

FIG. 4 is a flow chart of an example process 400 for configuring a debug code generation module. In one implementation, process 400 may be performed by client device 210/TCE 240. Alternatively, or additionally, process 400 may be performed by another device or a group of devices separate from or including client device 210/TCE 240. Process 400 will be described with reference to FIGS. 5A-5F. FIGS. 5A-5F are diagrams of example user interfaces 510-560 for receiving debugging information.

Figure 5A:
FIGS. 5A-5F are diagrams of example user interfaces for receiving debugging information.
Figure 5B:

As shown in FIG. 4, process 400 may include receiving types of debugging information (block 410), and receiving condition types for each type of debugging information (block 420). For example, as shown in FIG. 5A, user interface 510 may enable a user of TCE 240 to specify types of debugging information. For example, the user may specify test points (e.g., signal or state monitoring), input/output points (e.g., input/output value monitoring), break points (e.g., conditional break points), assertions (e.g., conditional break points with complex conditions), etc. associated with functional model 105. If the user specifies, for example, break points, user interface 520 of FIG. 5B may enable the user to specify types of break point conditions. For example, the user may specify data-based break point conditions (e.g., when a signal and/or variable has a specific value), time-based break point conditions (e.g., at a particular time), counter-based break point conditions (e.g., after a counter reaches a particular value), and any combination of the aforementioned break point conditions.

Figure 5C:
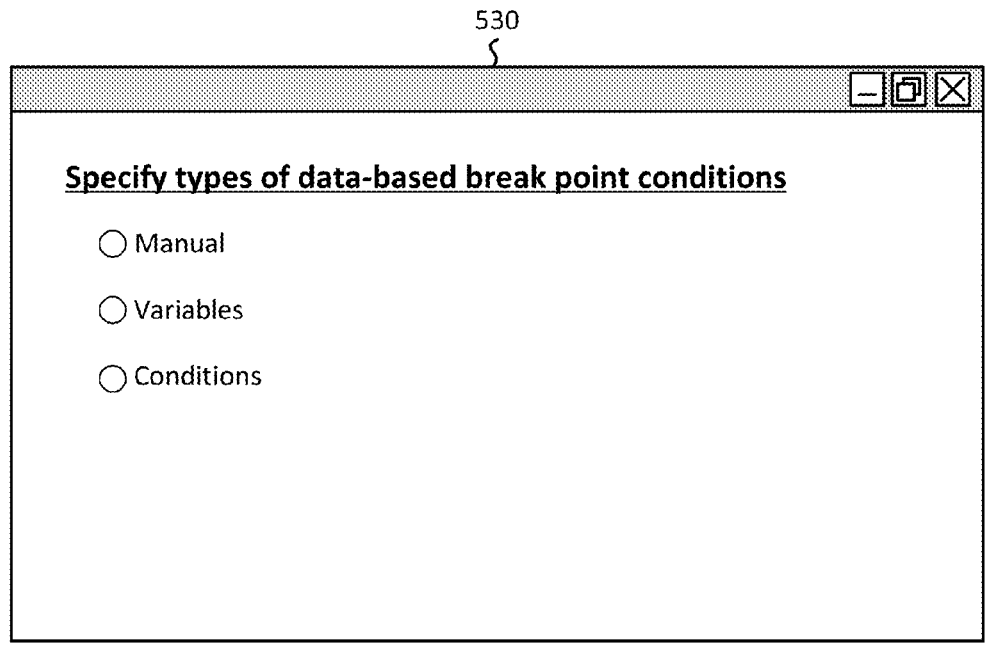
Figure 5D:
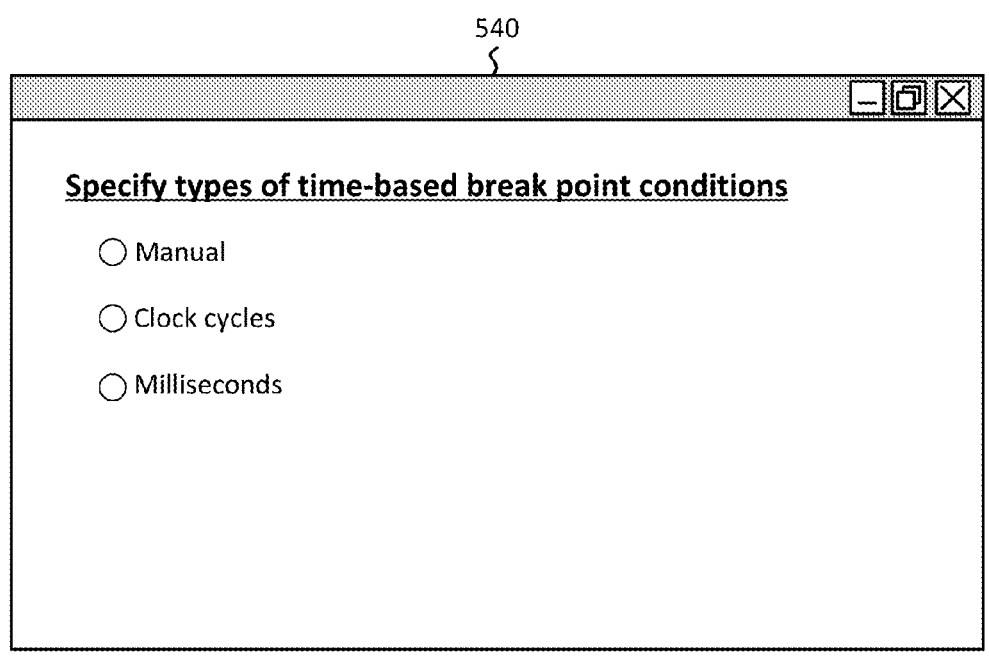
Figure 5E:
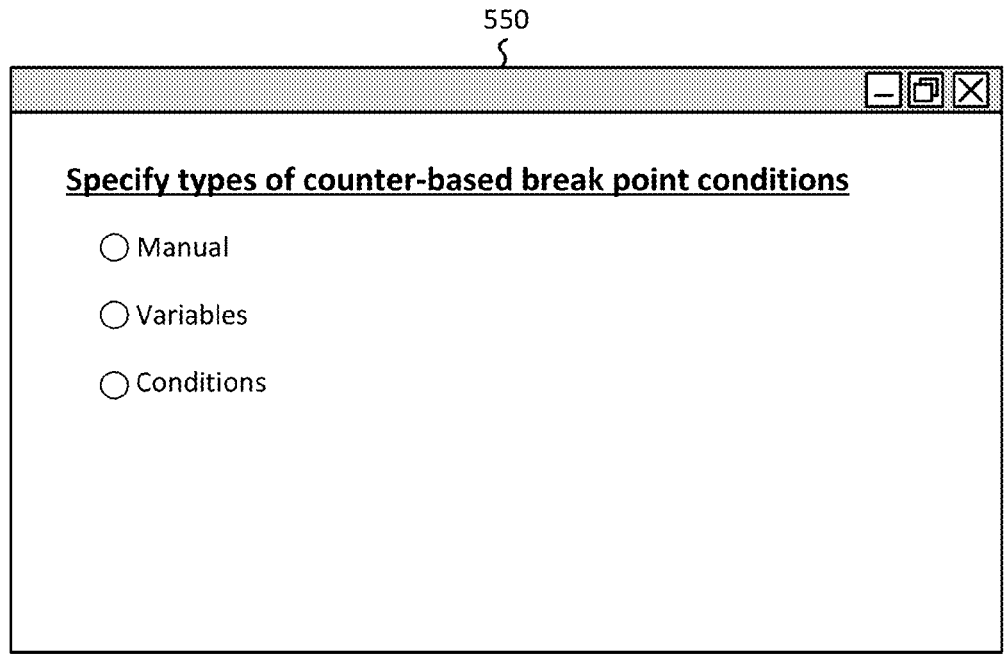

Returning to FIG. 4, process 400 may include receiving information associated with each condition type (block 430), and receiving other options for each type of debugging information (block 440). For example, as shown in FIG. 5C, user interface 530 may enable the user of TCE 240 to specify types of the data-based break point conditions, such as manual entry of data-based break point conditions, a set of variables associated with such conditions, a set of such conditions, etc. As shown in FIG. 5D, user interface 540 may enable the user to specify types of the time-based break point conditions, such as manual entry of time-based break point conditions, clock cycles per break point, milliseconds per break point, etc. As shown in FIG. 5E, user interface 550 may enable the user to specify types of the counter-based break point conditions, such as manual entry of counter-based break point conditions, a set of variables associated with such conditions, a set of such conditions, etc. Thus, user interfaces 530-550 may enable the user to specify information associated with each condition type (e.g., data-based, time-based, counter-based, etc.).

Figure 5F:
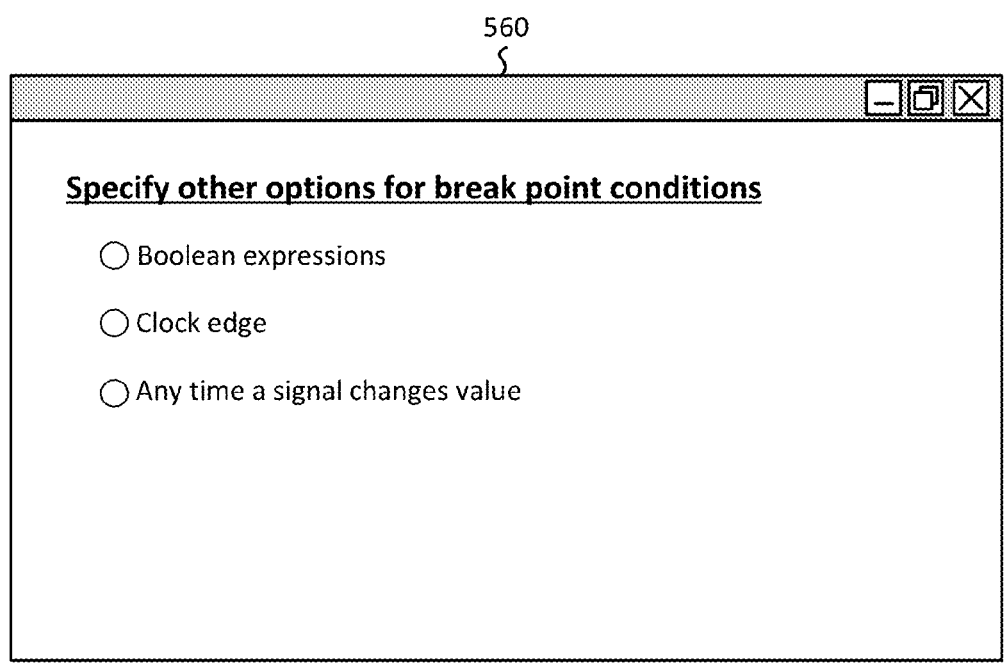

As shown in FIG. 5F, user interface 560 may enable the user to specify other options for the break point conditions. For example, the user may select Boolean expressions (e.g., AND, OR, etc.) that may be used to combine one or more break point conditions. Alternatively, or additionally, the user may select a clock edge to define a break point (e.g., establish break point when a clock transitions from one value to another value). Alternatively, or additionally, the user may define a break point any time a signal (e.g., in functional model 105) changes value.

TCE 240 may receive the information associated with each condition type and/or the other options for each type of debugging information, and may configure debug code generation module 110 with the received information. Alternatively, or additionally, TCE 240 may pre-configure debug code generation module 110 with the information associated with each condition type and/or the other options for each type of debugging information.

As further shown in FIG. 4, process 400 may include configuring a debug code generation module based on the received types of debugging information, the condition types, the information associated with each condition type, and/or the other options (block 450). For example, TCE 240 may configure debug code generation module 110 with the different types of debugging information, the different types of conditions for each type of debugging information, the information associated with each condition type, and/or the other options for each type of debugging information. Alternatively, or additionally, TCE 240 may pre-configure debug code generation module 110 with the different types of debugging information, the different types of conditions for each type of debugging information, the information associated with each condition type, and/or the other options, without receiving such information from a user.

Although FIGS. 5A-5F show example information that may be provided in user interfaces 510-560, in other implementations, user interfaces 510-560 may include less information, different information, and/or additional information than depicted in FIGS. 5A-5F.

Example Process for Unified Debugging of Hardware Code and Software Code

Figure 6:
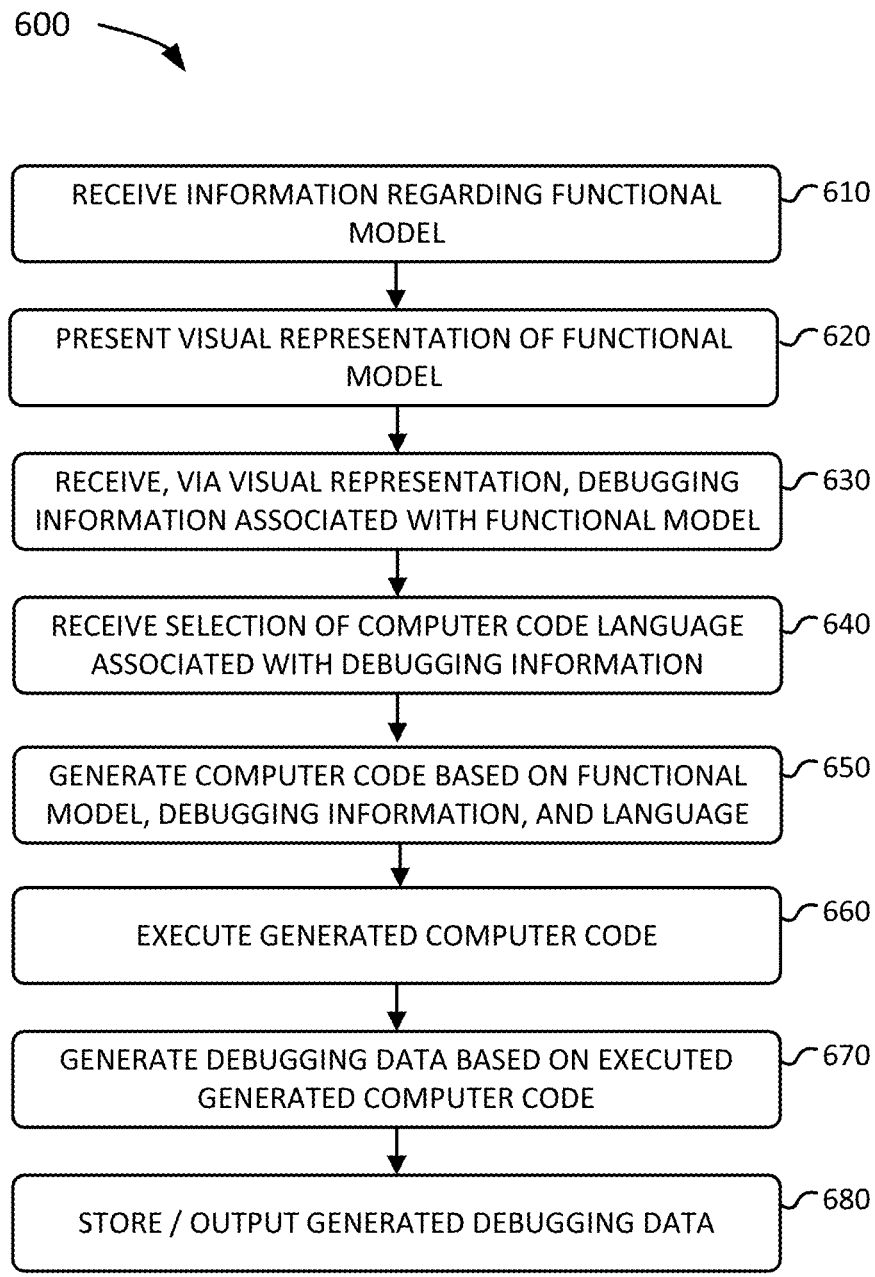
FIG. 6 is a flow chart of an example process for unified debugging of hardware code and software code.
Figure 7A:
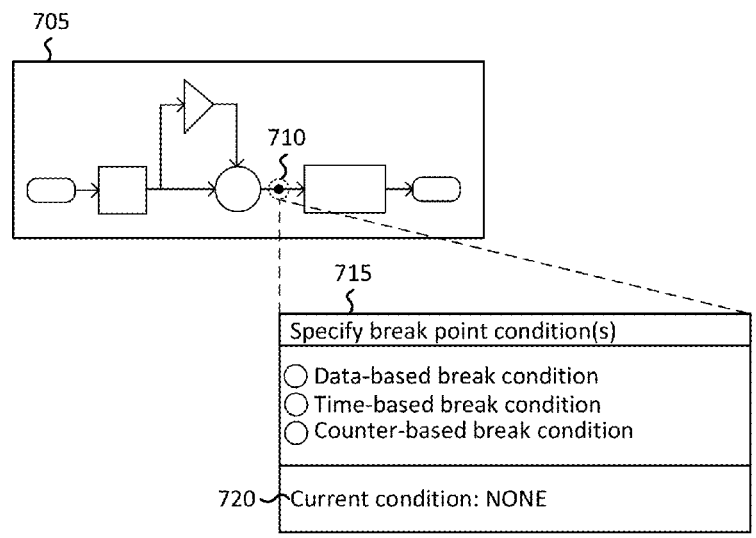
FIGS. 7A-7G are diagrams of example user interfaces for enabling unified hardware and software debugging.
Figure 8:
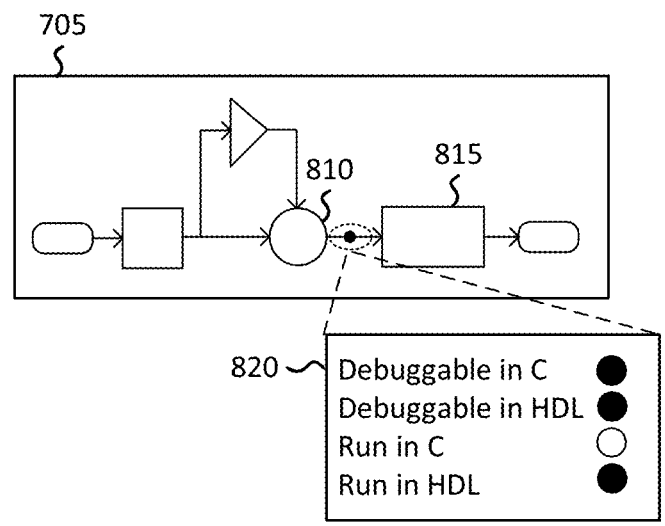
FIG. 8 is a diagram of an example user interface for enabling selection of program languages for debugging and execution.
Figure 9A:
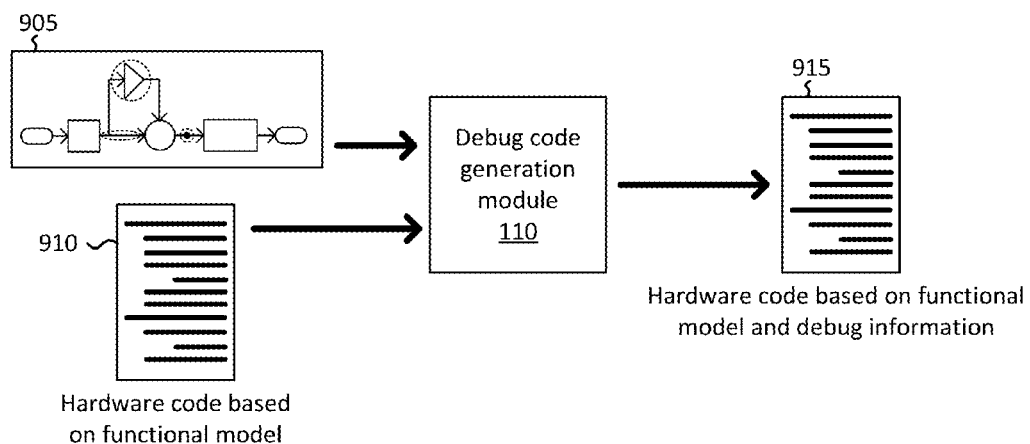
FIG. 9A is a diagram of example operations for generating machine code based on a functional model and debugging information.
Figure 9B:
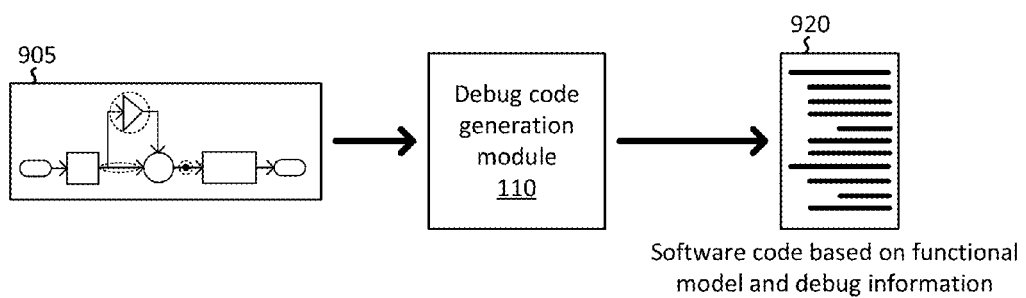
FIG. 9B is a diagram of example operations for generating software code based on a functional model and debugging information.
Figure 10:
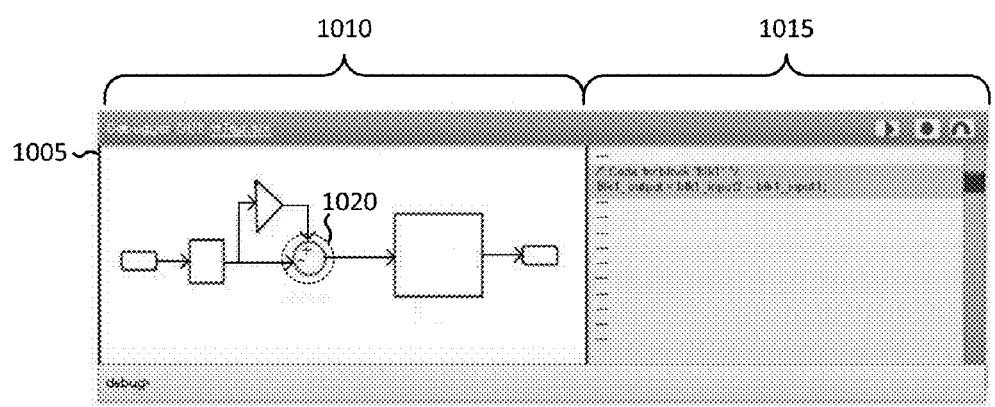
FIG. 10 is a diagram of an example user interface for viewing a functional model and code generated based on the functional model and debugging information.

FIG. 6 is a flow chart of an example process 600 for unified debugging of hardware code and software code. In one implementation, process 600 may be performed by client device 210/TCE 240. Alternatively, or additionally, process 600 may be performed by another device or a group of devices separate from or including client device 210/TCE 240. Process 600 will be described with reference to FIGS. 7A-10. FIGS. 7A-7G are diagrams of example user interfaces for enabling unified hardware and software debugging. FIG. 8 is a diagram of an example user interface for enabling selection of program languages for debugging and execution. FIGS. 9A and 9B are diagrams of example operations for generating machine code or software code based on a functional model and debugging information. FIG. 10 is a diagram of an example user interface for viewing a functional model and code generated based on the functional model and debugging information.

As shown in FIG. 6, process 600 may include receiving information regarding a functional model (block 610), and presenting a visual representation of the functional model (block 620). For example, TCE 240 may receive information associated with functional model 105 (FIG. 1), and may present a visual representation 705 of functional model 105, as shown in FIG. 7A. Functional model 105 may include computational semantics and may be executable (e.g., an executable unified modeling language (UML) diagram, an executable time-based block diagram, a state transition diagram, code provided in an array-based language, etc.). Functional model 105 may be associated with debugging information. The debugging information may include, for example, test points, input/output points, break points, assertions, etc. associated with functional model 105. The debugging information may include metadata that is separate from (e.g., in a separate file) or associated with functional model 105. In one example, functional model 105 may include a model generated from an array-based programming language, a dynamically typed programming language, etc. Functional model 105 may include inferred data types, sample times, dimensions, complexity, continuous and discrete times, etc. Visual representation 705 may include representations (e.g., blocks, connections, etc.) of information associated with functional model 105.

In one example implementation, functional model 105 may include a time-based block diagram model with blocks that represent dynamic systems and include differential equations, difference equations, and/or algebraic equations; a state transition diagram; a data flow diagram; a control flow diagram; dynamically typed text; array-based text; a declarative model; an imperative model; a model that allows constraints, equalities, and/or assignments; a model that allows inferring of execution attributes (e.g., execution order, task allocation, sample times, data types, complexity, dimensions, etc.); etc.

As further shown in FIG. 6, process 600 may include receiving, via the visual representation, debugging information associated with the functional model (block 630). For example, as shown in FIG. 7A, a user may utilize visual representation 705 to select a point 710 of functional model 105 where debugging is to be performed. The user may select point 710 (e.g., by double clicking on a location of point 710), and TCE 240 may provide a user interface 715 that enables the user to provide debugging information to TCE 240. The debugging information may include test points, input/output points, break points, assertions, etc. associated with functional model 105. In one example, user interface 715 may enable the user to specify break point condition(s), such as data-based, time-based, and/or counter-based break point conditions, as the debugging information. As further shown in FIG. 7A, if the user does not specify a break point condition, user interface 715 may indicate that a current condition is not specified, as indicated by reference number 720.

Figure 7B:
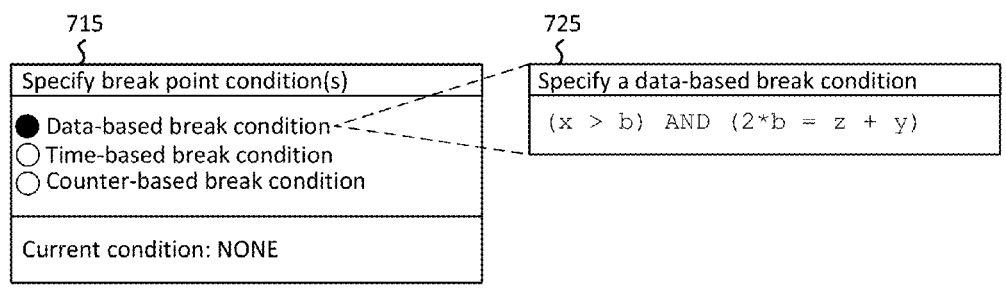
Figure 7C:
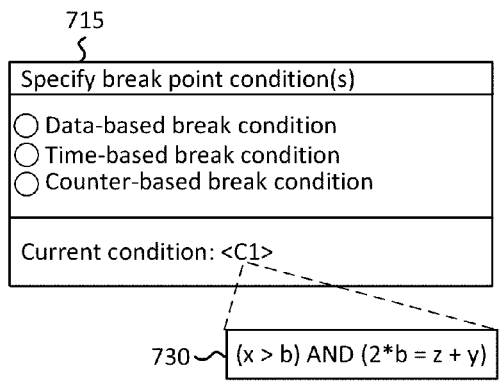

As shown in FIG. 7B, if the user selects the data-based break point condition in user interface 715, TCE 240 may provide a user interface 725 that enables the user to specify a data-based break point condition. In one example, the user may manually enter data associated with functional model 105 (e.g., (x>b) AND (2*b=z+y)) as the data-based break point condition in user interface 725. Alternatively, or additionally, the user may select the data-based break point condition from a set of variables and/or conditions provided in user interface 725. After the user specifies the data-based break point condition, user interface 715 may provide an indication that the current condition is <C1>, as shown in FIG. 7C. As further shown in FIG. 7C, the user may point to, select, etc. the indication, and TCE 240 may provide a user interface 730 that displays the data-based break point condition provided by the user in FIG. 7B.

Figure 7D:
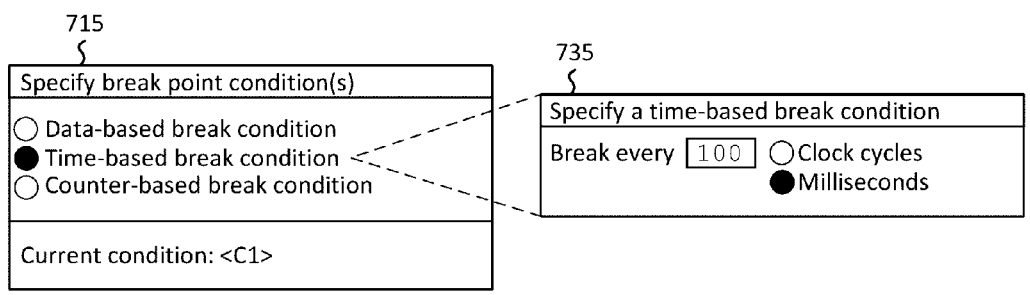
Figure 7E:
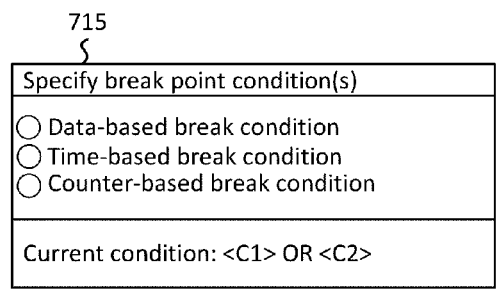
Figure 7F:
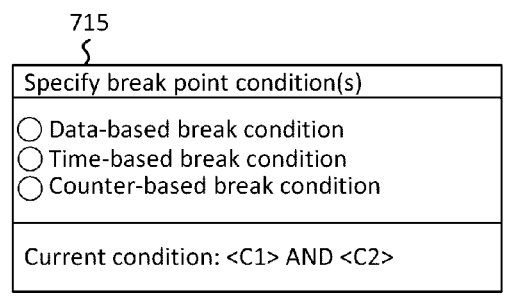

As shown in FIG. 7D, if the user selects the time-based break point condition in user interface 715, TCE 240 may provide a user interface 735 that enables the user to specify a time-based break point condition. In one example, the user may manually enter time information associated with functional model 105 (e.g., break every "100" clock cycles or milliseconds) as the time-based break point condition in user interface 735. Alternatively, or additionally, the user may select the time-based break point condition as clock cycles or a time period (e.g., milliseconds) in user interface 735. After the user specifies the time-based break point condition, user interface 715 may provide an indication that the current condition is <C1> OR <C2>, as shown in FIG. 7E. The condition <C1> may correspond to the data-based break point condition specified in FIG. 7B, and the condition <C2> may correspond to the time-based break point condition specified in FIG. 7D. Alternatively, or additionally, the user may specify how the conditions <C1> and <C2> are combined, such as with other Boolean operators (e.g., an AND operator in FIG. 7F), based on a clock edge, based on any time a signal changes value, etc.

Figure 7G:
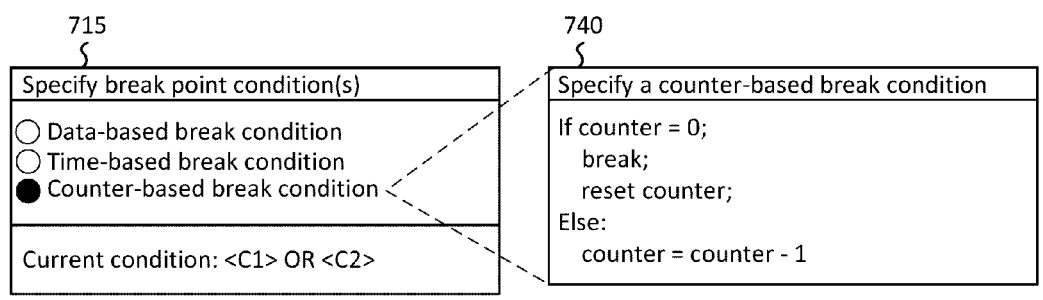

As shown in FIG. 7G, if the user selects the counter-based break point condition in user interface 715, TCE 240 may provide a user interface 740 that enables the user to specify a counter-based break point condition. In one example, the user may manually enter the counter-based break point condition in user interface 740, as follows:

If counter=0;
   break;
   reset counter;
Else:
   counter=counter−1.

Alternatively, or additionally, the user may select the counter-based break point condition from a set of variables and/or conditions provided in user interface 740. TCE 240 may receive the information provided by the user via the user interfaces of FIGS. 7A-7G.

In one example, the user may select a set of signals (e.g., test points) to be logged as the debugging information. Accessibility to the test points may be turned on and off by the user. The instantaneous values of the signals may be observed from outside the executing computer code 115 (FIG. 1), and multiple values of a same signal may be logged from outside the executing computer code 115. During execution of computer code 115, the user may dynamically select which signals to log and/or observe.

Returning to FIG. 6, process 600 may include receiving selection of a computer code language associated with the debugging information (block 640). For example, as shown in FIG. 8, the user may point to, select, etc. a line (e.g., a signal) connecting blocks 810 and 815 provided in visual representation 705 of functional model 105. When the user points to, selects, etc. the line, TCE 240 may provide a user interface 820 that enables the user to select one or more languages for debugging functional model 105, one or more languages for executing computer code 115 (FIG. 1), etc.

For example, the user may select the C language, the HDL, etc. for debugging functional model 105 and/or for executing computer code 115.

In one example implementation, if the user marks a block, line, variable, etc. of functional model 105 as being debugged in the C language and the HDL, debug code generation module 110 may automatically generate computer code 115, for the block, line, variable, etc. in the C language and the HDL. The user may switch between the C language version of computer code 115 and the HDL version of computer code 115 to debug timing issues (e.g., blocks and/or lines of computer code 115 may have different numerical outputs when executing in the C language or in the HDL due to different clock domains), debug fixed-point approximations (e.g., the C language and the HDL may use different fixed-point libraries), etc.

Alternatively, or additionally, the user may switch between the C language version of computer code 115 and the HDL version of computer code 115, for example, when the C language version of computer code 115 is legacy code with functionality modeled in functional model 105 and when the HDL version of the computer code 115 is generated for the C language version of computer code 115. Alternatively, or additionally, the user may switch between the C language version of computer code 115 and the HDL version of computer code 115, for example, when the HDL version of computer code 115 is legacy code with functionality modeled in functional model 105 and when the C language version of the computer code 115 is generated for the HDL version of computer code 115. The switching between the C language version of computer code 115 and the HDL version of computer code 115 may occur in a simulator or on a target hardware component (e.g., an application-specific integrated circuit (ASIC), a field-programmable gate array (FPGA), a CPU, a GPU, etc.) while executing computer code 115 or before executing computer code 115. Computer code 115 may include switch logic that enables the user to turn on or off execution in the C language or the HDL based on, for example, a block parameter in functional model 105. In one example, the switch logic may enable the user to on or off all or a portion of computer code 115 simultaneously.

Alternatively, or additionally, the user may designate a conditional break point as an event when there is a difference between execution of the C language version of computer code 115 and execution of the HDL version of computer code 115 for a block, line, variable, etc. marked for debugging in both the C language and the HDL in functional model 105. In some implementations, actions taken for conditional break points may include logging data when there is a discrepancy between the C language version of computer code 115 and the HDL version of computer code 115, logging a particular number of values before the event, etc.

Two debuggers (e.g., debuggers for the C language version of computer code 115 and the HDL version of computer code 115, debuggers for functional model 105 and computer code 115, etc.) may exchange information using inter-process communication (IPC) that may be hidden to the user. The IPC may include, for example, IPC shared memory on a Linux host machine, message passing on a Windows host machine, etc.

As further shown in FIG. 6, process 600 may include generating computer code based on the functional model, the debugging information, and the computer code language (block 650). For example, as shown in FIG. 9A, debug code generation module 110 may receive a functional model 905, debugging information associated with functional model 905, and hardware code 910 based on functional model 905. Functional model 905 may include the features of functional model 105 described herein. The debugging information may include, for example, test points, input/output points, break points, assertions, etc. associated with functional model 905. Hardware code 910 may include code, formulated in a hardware language (e.g., HDL, VHDL, Verilog, SystemC, etc.), that corresponds to functional model 905. As further shown in FIG. 9A, debug code generation module 110 may generate hardware code 915 based on functional model 905, hardware code 910, the debugging information, and/or a language selected by a user (e.g., as shown in FIG. 8). Alternatively, or additionally, debug code generation module 110 may modify hardware code 910, based on the debugging information, to produce hardware code 915. In one example, hardware code 915 may include compiled hardware code (e.g., code in the HDL, the Verilog language, etc.) that may be executed. When generating hardware code 915, debug code generation module 110 may introduce further functionality to implement debugging information (e.g., break point behavior), for example, because there is no concept of sequential execution in hardware code 915. In one example, debug code generation module 110 may introduce logic to prevent execution of a particular set of high level function blocks of functional model 905.

Hardware code, unlike software code, may execute concurrently and not sequentially. This may imply that it is not possible to halt execution after a certain operation performs (e.g., when a multiplication is executed but before a sum that uses the result of the multiplication is execute). Additionally, the user may not desire to halt or break the entire hardware execution, but only one section or module of it. To handle this circumstance, debug code generation module 110 may generate additional logic to effectively halt execution so that the workings can be examined or debugged. For instance, the generated HDL code could, when a break condition is true, may latch values of input and output signals, and may disable execution of a relevant section. At this point, by making the input, output, and designated internal sections available via a software portion or other means, it may be possible for the user to perform debugging steps. Since the code is generated from a high level view, the user may not have to specify the mechanism, but rather may indicate a desire to debug. Debug code generation module 110 may automatically insert the additional logic to implement the debugging functionality. In some implementations, different, additional, simpler, or more complex conditions can also be satisfied by this mechanism. For example, when a break condition is satisfied, a counter may start decrementing down from a number. When the counter reaches zero, a latch operation and a disable operation may be triggered. This may allow debug code generation module 110 to halt the number of clock steps after the break condition has been satisfied.

In some implementations, these operations may be executed concurrently on hardware and not on a software based simulator (e.g., which may emulate concurrency via sequential operations). This may permit use of physical input and output data, and may provide improved execution performance, but may not require advanced knowledge by the user.

In one example implementation, debug code generation module 110 may align hardware code 910 sequentially in line with hardware code 915. When debug code generation module 110 generates hardware code 915, debug code generation module 110 may not optimize out variables that have been specified by the debugging information. For example, b=2*a and a=3 may normally be optimized to b=6, but if a or b is a variable to monitor, debug code generation module 110 may not optimize out a or b.

Alternatively, or additionally, as shown in FIG. 9B, debug code generation module 110 may generate software code 920 based on functional model 905, the debugging information, and/or a language selected by a user (e.g., as shown in FIG. 8). In one example, software code 920 may include software code (e.g., code in the C language, the Java language, etc.) that may be executed after being compiled. Generating debugging information for functional model 905 may be more straightforward for software code 920 than for hardware code 915 because debug code generation module 110 may know exactly where debugging (e.g., a break point) should occur in functional model 905. Debug code generation module 110 may know what element (e.g., block) of functional model 905 is associated with the break point and which line of software code 920 corresponds to the break point. Debug code generation module 110 may provide traceability information between functional model 905 and software code 920. In one example, one break point may end up in multiple lines of software code 920 (e.g., a block of functional model 905 may execute an output, an update, a derivative method, etc. that are separate lines of software code 920).

Returning to FIG. 6, process 600 may include executing the generated computer code (block 660), and generating debugging data based on the executed generated computer code (block 670). For example, TCE 240 may execute computer code 115, and may generate debugging data based on the execution of computer code 115. The debugging data may include data generated based on the debugging information associated with functional model 105. For example, if the debugging information specifies "monitor variable A" in functional model 105, the debugging data may include identified values of variable A over time. In one example, the debugging data and additional debugging information in computer code 115 may be related to the debugging information of functional model 105. The additional debugging information in computer code 115 may be added by debug code generation module 110 and may not be provided by the debugging information of functional model 105.

In one example, TCE 240 may execute one or more portions of computer code 115 in a simulator, an emulator, etc. Alternatively, or additionally, TCE 240 may execute one or more portions of computer code 115 on a target hardware component (e.g., an ASIC, a FPGA, a CPU, a GPU, etc.). As described above in connection with FIGS. 9A and 9B, computer code 115 may include hardware code 915 and/or software code 920. Computer code 115 may be manually executed and/or may be automatically generated (e.g., by debug code generation module 110) from all or a portion of functional model 105.

In one example implementation, TCE 240 may perform unified debugging of hardware code and software code by simultaneously debugging functional model 105 and computer code 115 (e.g., executing computer code 115). For example, debug code generation module 110 may step through a list of blocks, lines, variables, etc. of functional model 105, and may trigger execution of the list of blocks, lines, variables, etc. in computer code 115. TCE 240 may display functional model 105 in a debug mode and computer code 115 in the debug mode either simultaneously or in an alternating manner. TCE 240 may enable traceability of the debugging between functional model 105 and computer code 115. For example, TCE 240 may enable debugging traceability from functional model 105 to computer code 115 by tracing from a block, line, variable, etc. in functional model 105 to a line, variable, etc. in computer code 115. Alternatively, or additionally, TCE 240 may enable debugging traceability from computer code 115 to functional model 105 by tracing back from a line, variable, etc. in computer code 115 to a block, line, variable, etc. in functional model 105. Such traceability may be visually presented to the user via annotations, highlighting, colored text, etc.

As further shown in FIG. 6, process 600 may include storing and/or outputting the generated debugging data (block 680). For example, TCE 240 may store and/or output (e.g., provide for display) the generated debugging data. If the debugging info specifies a test point (e.g., a signal to monitor), TCE 240 may store and/or output values of that signal periodically (e.g., every clock cycle). In some implementations, when computer code 115 is generated, TCE 240 may provide a user interface 1005, as shown in FIG. 10. User interface 1005 may enable the user to view a portion 1010 of functional model 105 in a side-by-side relation to a portion 1015 of computer code 105. This may aid the user in debugging one or more portions of functional model 105, such as portion 1020 of functional model 105. Portions 1010 and 1015 shown side-by-side may capture the same functionality and portion 1015 (e.g., a code pane) may be automatically generated (e.g., with the debugging information) from portion 1010 (e.g., a model pane).

In one example implementation, the debugging information of functional model 105 may include a conditional break point in functional model 105. The conditional break point may be specified as at least one of a variable value conditional break point that specifies a point at which to halt execution of computer code 115 when a particular variable value meets a particular condition, a time conditional break point that specifies a point at which to halt execution of computer code 115 based on a particular time-based condition, and/or a counter break point that specifies a point at which to halt execution of computer code 115 based on a particular value of a counter.

When computer code 115 includes hardware code 915 (FIG. 9A), executing computer code 115 based on the debugging information may include identifying, during execution of computer code 115, a break point indicated by the debugging information. The break point may be associated with at least one of an input or an output of a particular functional block of functional model 105. Execution of computer code 115 may be halted based on identifying the break point. Halting execution of computer code 115 may include holding a value constant while halting execution of computer code 115, where the value is associated with the at least the input or the output of the particular functional block.

Although FIGS. 7A-8 and 10 show example information that may be provided in user interfaces, in other implementations, the user interfaces of FIGS. 7A-8 and 10 may include less information, different information, and/or additional information than depicted in FIGS. 7A-8 and 10.

CONCLUSION

Systems and/or methods described herein may enable a user to define debugging information in a high level programming language, and may rewrite the debugging information to a lower level programming language so that debugging may occur in the lower level programming language. In one example implementation, the systems and/or methods may provide unified debugging of an application which is implemented in a combination of declarative programming languages and imperative programming languages. In other words, depending on the application, the high level programming language may be converted into a combination of descriptive languages, imperative languages, or either of these languages. The systems and/or methods may provide a unified interface for debugging the application, independent of the final form of the application, which may be a combination of hardware code, compilable software code, as well as interpreted code that executes in conjunction with an executive and need not be compiled.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 4 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving information specifying a functional model that includes a set of variables and a set of computations,
      the receiving the information being performed by a device;
   receiving debugging information associated with the functional model,
      the receiving the debugging information being performed by the device;
   generating computer code, which includes a first type of computer code and a second type of computer code for a same portion of the functional model, based on:
      the set of computations associated with the functional model,
      the set of variables associated with the functional model, and
      the debugging information,
      the first type of computer code being in a first programming language, the second type of computer code being in a second programming language, the first programming language being different than the second programming language,
   the generating being performed by the device; and
   executing the computer code to compare a behavior of the first type of computer code to a behavior of the second type of computer code,
      the debugging information including a conditional break point in the functional model triggered by a difference between execution of the first type of computer code and the second type of computer code for the same portion of the functional model,
      the executing being performed by the device.

2. The method of claim 1, where the debugging information specifies at least one of:
   a variable, of the functional model, to monitor,
   a break point in the functional model,
   an assertion associated with the functional model,
   a test point associated with the functional model, or
   an input/output point associated with the functional model.

3. The method of claim 1, where the functional model includes one or more of:
   a time-based block diagram model with blocks that represent dynamic systems and include differential equations, difference equations, or algebraic equations,
   a state transition diagram,
   a data flow diagram,
   a control flow diagram,
   dynamically typed text,
   array-based text,
   a declarative model,
   an imperative model,
   a model that allows constraints, equalities, or assignments, or
   a model that allows inferring of execution attributes.

4. The method of claim 1, where receiving the information specifying the functional model includes:
   receiving graphical information specifying the functional model via a technical computing environment.

5. The method of claim 4, where receiving the debugging information includes:
   receiving graphical information specifying the debugging information via the technical computing environment,
   the graphical information specifying the debugging information based on the graphical information specifying the functional model.

6. The method of claim 1, where generating the computer code based on the debugging information includes:
   inserting meta information, based on the debugging information, into the computer code.

7. The method of claim 1,
   where generating the computer code based on the debugging information includes:
      inserting other computer code, based on the conditional break point, into the computer code.

8. The method of claim 1, where the debugging information includes another conditional break point in the functional model, and
where the other conditional break point is specified as at least one of:
a variable value conditional break point that specifies a point at which to halt execution when a particular variable value meets a particular condition,
a time conditional break point that specifies a point at which to halt execution based on a particular time-based condition, or
a counter break point that specifies a point at which to halt execution based on a particular value of a counter.

9. The method of claim 1, where the first type of computer code includes hardware code,
where executing the computer code based on the debugging information includes:
identifying, during the execution of the computer code, a break point indicated by the debugging information, the break point being associated with at least one of an input or an output of a particular functional block of the functional model, and
halting the execution of the computer code based on identifying the break point, where halting the execution of the computer code comprises:
holding a value constant while halting execution, the value being associated with the at least the input or the output of the particular functional block.

10. The method of claim 1, where the first programming language is a hardware programming language and the first type of computer code is hardware code associated with a first portion of the functional model, and
where the second programming language is a software programming language and the second type of computer code is software code associated with a second portion of the functional model,
where the debugging information includes first debugging information associated with the first portion of the functional model, and second debugging information associated with the second portion of the functional model.

11. The method of claim 1, further comprising:
displaying, via a technical computing environment, a visual representation of at least a portion of the functional model, and
displaying, via the technical computing environment, a visual representation of at least a portion of the computer code, the at least the portion of the computer code being associated with the at least the portion of the functional model.

12. The method of claim 11, where displaying the visual representation of the at least the portion of the functional model includes:
displaying the visual representation of the at least the portion of the functional model simultaneously with displaying the visual representation of the at least the portion of the computer code.

13. The method of claim 12, where the visual representation of the at least the portion of the functional model and the visual representation of the at least the portion of the computer code are provided in an interactive debugging environment.

14. The method of claim 13, where the interactive debugging environment includes at least one shared interface modality.

15. The method of claim 1, where generating the computer code comprises:
interspersing the debugging information in the computer code, where the debugging information is removable from the computer code and is turned on or off by a setting.

16. The method of claim 1, where generating the computer code comprises:
generating the first type of computer code based on rewriting at least a portion of the debugging information to the first programming language, and
generating the second type of computer code, different than the first type of computer code, based on rewriting at least a portion of the debugging information to the second programming language,
where executing the computer code comprises:
executing the first type of computer code, in the first programming language, and the second type of computer code, in the second programming language, concurrently to compare the behavior of the first type of computer code to the behavior of the second type of computer code.

17. A device comprising:
one or more processors to:
receive information specifying a functional model that includes a set of variables and a set of computations,
receive debugging information associated with the functional model,
generate computer code, which includes a first type of computer code and a second type computer code for a same portion of the functional model, based on:
the set of computations associated with the functional model,
the set of variables associated with the functional model, and
the debugging information,
the first type of computer code being in a first programming language,
the second type of computer code being in a second programming language,
the first programming language being different than the second programming language, and
execute the computer code to compare a behavior of the first type of computer code to a behavior of the second type of computer code,
the debugging information including a conditional break point in the functional model triggered by a difference between execution of the first type of computer code and the second type of computer code for the same portion of the functional model.

18. The device of claim 17, where the debugging information specifies at least one of:
a variable, of the functional model, to monitor,
a break point in the functional model,
an assertion associated with the functional model,
a test point associated with the functional model, or
an input/output point associated with the functional model.

19. The device of claim 17, where, when receiving the debugging information, the one or more processors are further to:
receive graphical information specifying the debugging information via a technical computing environment,
the graphical information specifying the debugging information based on the graphical information specifying the functional model.

20. The device of claim 17, where, when generating the computer code based on the debugging information, the one or more processors are further to:
   insert meta information, based on the debugging information, into the computer code.

21. The device of claim 17,
   where, when generating the computer code based on the debugging information, the one or more processors are further to:
      insert other computer code, based on the conditional break point, into the computer code.

22. The device of claim 17, where the debugging information includes another conditional break point in the functional model, and
   where the other conditional break point is specified as at least one of:
      a variable value conditional break point that specifies a point at which to halt execution when a particular variable value meets a particular condition,
      a time conditional break point that specifies a point at which to halt execution based on a particular time-based condition, or
      a counter break point that specifies a point at which to halt execution based on a particular value of a counter.

23. The device of claim 17, where the first programming language is a hardware programming language and the first type of computer code is hardware code associated with a first portion of the functional model, and
   where the second programming language is a software programming language and the second type of computer code is software code associated with a second portion of the functional model,
   where the debugging information includes first debugging information associated with the first portion of the functional model, and second debugging information associated with the second portion of the functional model.

24. The device of claim 17, where the one or more processors are further to:
   display, via a technical computing environment, a visual representation of at least a portion of the functional model, and
   display, via the technical computing environment, a visual representation of at least a portion of the computer code, the at least the portion of the computer code being associated with the at least the portion of the functional model.

25. The device of claim 24, where displaying the visual representation of the at least the portion of the functional model is performed simultaneously with displaying the visual representation of the at least the portion of the computer code.

26. The device of claim 25, where the visual representation of the at least the portion of the functional model and the visual representation of the at least the portion of the computer code are provided in an interactive debugging environment.

27. The device of claim 26, where the interactive debugging environment includes at least one shared interface modality.

28. The device of claim 17, where the debugging information is removable from the computer code and is turned on or off by a setting.

29. The device of claim 17, where the computer code includes the debugging information, and the debugging information is removed from the computer code based on an integer setting.

30. One or more non-transitory computer-readable media, comprising:
   one or more instructions that, when executed by a processor of a device, cause the processor to:
      receive information specifying a functional model that includes a set of variables and a set of computations,
      receive debugging information associated with the functional model,
      generate computer code, which includes a first type of computer code and a second type of computer code for a same part of the functional model, based on:
         the set of computations associated with the functional model,
         the set of variables associated with the functional model, and
         the debugging information,
         the first type of computer code being in a first code language,
         the second type of computer code being in a second code language,
         the first code language being different than the second code language,
      execute the computer code to compare a behavior of the first type of computer code to a behavior of the second type of computer code, the executing generating debugging data,
         the debugging information including a conditional break point in the functional model triggered by a difference between execution of the first type of computer code and the second type of computer code for the same part of the functional model, and
      output or store the debugging data.

31. The device of claim 17, where the first type of computer code includes hardware code, and
   where, when executing the computer code based on the debugging information, the one or more processors are further to:
      identify, during execution, a break point indicated by the debugging information, the break point being associated with at least one of an input or an output of a particular functional block of the functional model, and
      halt execution of the computer code based on identifying the break point.

32. The method of claim 1, where the first type of computer code is hardware code and the second type of computer code is software code,
   where generating the computer code further comprises:
      generating the hardware code and the software code for the same portion of the functional model, and
   where the debugging information includes the conditional break point in the functional model triggered by a difference between execution of the hardware code and the software code for the same portion of the functional model.

33. The method of claim 1, further comprising:
   generating debugging data based on executing the computer code; and
   outputting the debugging data.

* * * * *